(12) United States Patent
Wang et al.

(10) Patent No.: US 11,393,243 B2
(45) Date of Patent: Jul. 19, 2022

(54) STRUCTURAL COMPONENT, ELECTRONIC APPARATUS, AND FINGERPRINT MODULE ASSEMBLY METHOD

(71) Applicant: Huawei Technologies Co., Ltd., Shenzhen (CN)

(72) Inventors: Fengping Wang, Dongguan (CN); Yinghua Cheng, Shenzhen (CN); Wentao Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 16/759,042

(22) PCT Filed: Oct. 27, 2017

(86) PCT No.: PCT/CN2017/108041
§ 371 (c)(1),
(2) Date: Apr. 24, 2020

(87) PCT Pub. No.: WO2019/080096
PCT Pub. Date: May 2, 2019

(65) Prior Publication Data
US 2020/0372233 A1    Nov. 26, 2020

(51) Int. Cl.
*G06V 40/13* (2022.01)
*G06F 1/16* (2006.01)

(52) U.S. Cl.
CPC ........ *G06V 40/1318* (2022.01); *G06F 1/1684* (2013.01)

(58) Field of Classification Search
CPC .......................... G06V 40/1318; G06F 1/1684
USPC ........................................................... 349/12
See application file for complete search history.

(56) References Cited

U.S. PATENT DOCUMENTS

| | | | |
|---|---|---|---|
| 2010/0097080 A1* | 4/2010 | Kobayashi | ........... H03K 17/962 324/692 |
| 2015/0371076 A1 | 12/2015 | Lee et al. | |
| 2016/0274687 A1 | 9/2016 | Li | |
| 2017/0300736 A1 | 10/2017 | Song et al. | |
| 2018/0107312 A1 | 4/2018 | Wang et al. | |

(Continued)

FOREIGN PATENT DOCUMENTS

| | | |
|---|---|---|
| CN | 103729615 A | 4/2014 |
| CN | 104050405 A | 9/2014 |

(Continued)

*Primary Examiner* — Charles S Chang
(74) *Attorney, Agent, or Firm* — Conley Rose, P.C.

(57) ABSTRACT

An electronic apparatus includes a screen and a fingerprint circuit, where an inner surface of the screen is a light shielding layer. The light shielding layer includes a light transmission region located in a display area of the screen, and the fingerprint circuit is attached to the light transmission region using a frame adhesive. The fingerprint circuit includes a first surface facing the screen, a second surface facing away from the screen, and a side surface coupled between the first surface and the second surface. The frame adhesive includes a first connection area and a second connection area that are coupled together, where the second connection area is located on a periphery of the first connection area, the first connection area and the second connection area are bonded to the first surface, and the second connection area is fastened to the side surface using a first sealing adhesive.

20 Claims, 4 Drawing Sheets

(56) References Cited

U.S. PATENT DOCUMENTS

| | | | |
|---|---|---|---|
| 2018/0260602 A1* | 9/2018 | He | A61B 5/14542 |
| 2018/0315803 A1* | 11/2018 | Jin | G06V 40/13 |
| 2018/0331163 A1 | 11/2018 | Yang et al. | |
| 2018/0373913 A1* | 12/2018 | Panchawagh | G01S 7/52079 |

FOREIGN PATENT DOCUMENTS

| | | | |
|---|---|---|---|
| CN | 104679338 A | 6/2015 | |
| CN | 104836867 A | 8/2015 | |
| CN | 105068705 A | 11/2015 | |
| CN | 105807994 A | 7/2016 | |
| CN | 106339670 A | 1/2017 | |
| CN | 106384091 A | 2/2017 | |
| CN | 205961234 U | 2/2017 | |
| CN | 206178885 U | 5/2017 | |
| CN | 206209785 U | 5/2017 | |
| CN | 106843595 A | 6/2017 | |
| CN | 206400421 U | 8/2017 | |
| CN | 107153826 A | 9/2017 | |
| CN | 107180599 A | 9/2017 | |
| CN | 107193412 A | 9/2017 | |
| JP | 2010103240 A | 5/2010 | |
| JP | 2010224081 A | 10/2010 | |
| JP | 2014075509 A | 4/2014 | |
| JP | 2016106648 A | 6/2016 | |

\* cited by examiner

STRUCTURAL COMPONENT, ELECTRONIC APPARATUS, AND FINGERPRINT MODULE ASSEMBLY METHOD

CROSS-REFERENCE TO RELATED APPLICATIONS

This application is a U.S. National Stage of International Patent Application No. PCT/CN2017/108041 filed on Oct. 27, 2017, which is hereby incorporated by reference in its entirety.

TECHNICAL FIELD

This application relates to the field of fingerprint recognition technologies, and in particular, to a structural component having a fingerprint module and a screen, an electronic apparatus having the structural component, and a fingerprint module assembly method.

BACKGROUND

A fingerprint recognition technology is generally applied to an electronic apparatus such as an intelligent terminal, especially a smartphone. Generally, to avoid affecting a normal display effect of a display area, a fingerprint recognition module is disposed in a non-display area of a display screen. However, disposing the fingerprint recognition module in the non-display area inevitably increases an area of the non-display area, and decreases a screen-to-body ratio of the display screen.

Disposing the fingerprint recognition module in a display area is a research area in the industry.

SUMMARY

Embodiments of this application provide a method for assembling a structural component, an electronic apparatus and a fingerprint module. The structural component provided in the present invention includes a screen and a fingerprint module that are used for display. The fingerprint module is disposed in a display area of a display screen, and is stacked with the screen in the display area, to increase a screen-to-body ratio.

According to a first aspect, this application provides a structural component, including a screen and a fingerprint module, where an outer surface of the screen is a touch surface, an inner surface of the screen is a light shielding layer. The light shielding layer includes a light transmission region located in a display area of the screen, and the fingerprint module is attached to the light transmission region of the screen by using a frame adhesive. The fingerprint module includes a first surface facing the screen, a second surface away from the screen, and a side surface connected between the first surface and the second surface. The frame adhesive includes a first connection area and a second connection area that are connected, where the second connection area is located on a periphery of the first connection area, both the first connection area and the second connection area are bonded to the first surface, and the second connection area is fastened to the side surface by using a first sealing adhesive.

In this embodiment of this application, the fingerprint module is disposed in the display area of the screen, and the fingerprint module is fastened by using the frame adhesive and the first sealing adhesive, so that the first surface of the fingerprint module is fastened to the screen by using the frame adhesive, and the side surface of the fingerprint module is fastened to the second connection area of the frame adhesive by using the first sealing adhesive. In this way, the fingerprint module is firmly fastened, and a path between the fingerprint module and the screen is well sealed to prevent moisture from entering a fingerprint recognition area of the fingerprint module.

In an implementation, the light transmission region is formed by disposing a through hole on the light shielding layer, the frame adhesive is accommodated in the through hole, and an installation space is formed between the frame adhesive and an inner wall of the through hole. In this implementation, the through hole is formed by removing a part of material of the light shielding layer, so that a thickness of the screen at the light transmission region is reduced, and the frame adhesive is accommodated in the through hole. This helps reduce the overall thickness of the structural component and the electronic apparatus. The formation of an installation space facilitates installation and removal of the frame adhesive and the fingerprint module. During the installation and removal, the installation space facilitates the use of a tool.

In an implementation, the light transmission region is an area having a plurality of small light transmission holes, and the plurality of small holes are disposed on the light shielding layer and distributed in an array.

In an implementation, the second connection area includes an outer edge away from the first connection area, the outer edge is fastened to the light transmission region by using a second sealing adhesive, and a gap is disposed between the second sealing adhesive and an inner wall of the through hole. The second sealing adhesive increases a bonding force between the frame adhesive and the screen.

In an implementation, the outer edge of the second connection area includes an attaching surface bonded to the light transmission region, an outer surface away from the screen, and a side connection surface connected between the attaching surface and the outer surface, and the second sealing adhesive covers the side connection surface and a part of the exposed surface. In other words, the second sealing adhesive wraps two surfaces at a corner of the outer edge of the second connection area, to improve bonding.

In an implementation, the side surface of the fingerprint module includes a step surface and/or a rough surface, and the first sealing adhesive is bonded to the step surface and/or the rough surface, to improve bonding reliability. The step surface and the rough surface increase an area in which the first sealing adhesive is bonded to the side surface of the fingerprint module, to improve bonding strength.

In an implementation, a size of the second connection area is greater than a size of the first connection area. A size of the second connection area is greater than that of the first connection area, and an area in which the frame adhesive is bonded to the screen is greater than twice an area in which the frame adhesive is bonded to the fingerprint module, so that the bonding is more stable and the fingerprint module is not easy to fall off.

In an implementation, the frame adhesive is of an opaque structure. The first surface of the fingerprint module includes a recognition area and a frame area surrounding the recognition area, the frame adhesive is attached to the frame area, and an air layer is formed between the recognition area and the screen. In this implementation, the light shielding layer is replaced with the opaque frame adhesive for a light shielding effect, to satisfy the display effect of the screen.

In an implementation, the fingerprint module is partially embedded into the through hole, so that a size of the structural component and the electronic apparatus is thinner.

In an implementation, the frame adhesive is an integrated closed frame structure.

In an implementation, the frame adhesive includes a plurality of segments of sub-adhesive, and the plurality of segments of sub adhesive are arranged in a frame structure.

In an implementation, a flexible circuit board is disposed on the second surface, a screen connector is disposed on the screen, and the flexible circuit board is electrically connected to the screen connector.

In an implementation, a stiffener is disposed on a side that is of the flexible circuit board and that is away from the second surface.

According to a second aspect, this application provides an electronic apparatus, including the structural component provided in any one of the foregoing implementations.

According to a third aspect, this application further provides a fingerprint module assembly method, including:

providing a screen, where an outer surface of the screen is a touch surface, an inner surface of the screen is a light shielding layer, a light transmission region is formed on the light shielding layer, and the light transmission region is formed in a display region of the screen;

attaching a frame adhesive to the light transmission region, where the frame adhesive includes a first connection area and a second connection area that are connected, and the second connection area is located on a periphery of the first connection area;

providing a fingerprint module, where the fingerprint module includes a first surface facing the screen, a second surface away from the screen, and a side surface connected between the first surface and the second surface;

bonding the first surface of the fingerprint module to the first connection area and the second connection area; and disposing a first sealing adhesive between the second connection area and the side surface of the fingerprint module.

In an implementation, the light transmission region is formed by disposing a through hole on the light shielding layer, and an installation space is formed between the frame adhesive and an inner wall of the through hole.

In an implementation, the method further includes: disposing a second sealing adhesive between an outer edge that is of the second connection area and that is away from the first connection area and the light transmission region.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes embodiments of the present invention with reference to the accompanying drawings in the embodiments of the present invention.

Structural components provided in the embodiments of this application include a screen and a fingerprint module. The structural components are applied to an electronic apparatus and a mobile terminal, for example, a smartphone, a tablet computer, and a multimedia player.

A screen is a display screen of an electronic apparatus. In an implementation, a display screen is an organic light-emitting diode (Organic Light-Emitting Diode, OLED) display screen. The display screen, which is a self-luminous display screen, includes a glass cover, an optical transparent adhesive layer, a touch display module, and a light shielding layer that are sequentially stacked. The light shielding layer is a bottom layer of a backlight layer of the touch display module.

Figure 1:
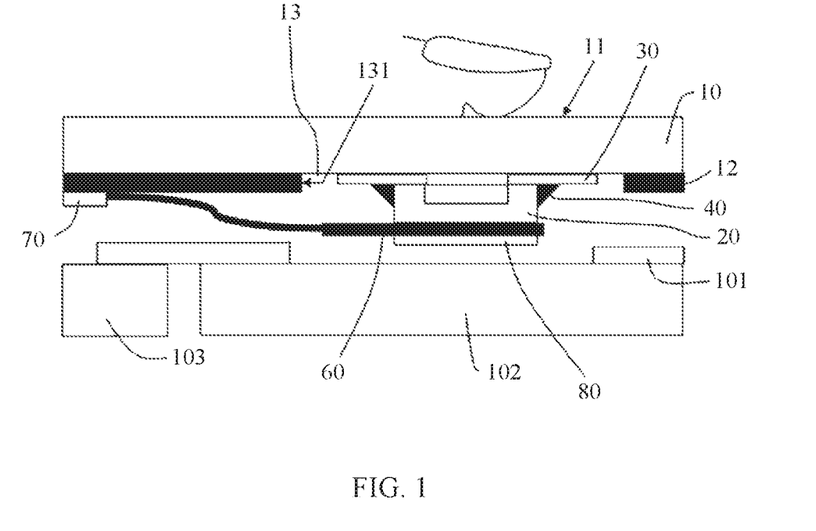
FIG. 1 is a schematic cross-sectional diagram of a structural component according to an embodiment of this application.

The screen includes a display area and a non-display area, and the non-display area surrounds the display area. Referring to FIG. 1, an outer surface of a screen 10 is a touch surface 11, an inner surface of the screen 10 is a light shielding layer 12, and the light shielding layer 12 includes a light transmission region 13 disposed in the display area of the screen. In an embodiment of FIG. 1, the light transmission region 13 is a large-area through hole disposed on the light shielding layer 12, and a fingerprint module 20 is installed in the through hole.

The fingerprint module 20 is attached to the light transmission region 13 of the screen 10 by using a frame adhesive 30.

In the accompanying drawings, the light transmission regions 13 are all drawn as a large-area through hole.

In another implementation, the light transmission region is an area having a plurality of small light transmission holes, and the plurality of small holes are disposed on the light shielding layer and distributed in an array.

Figure 2:
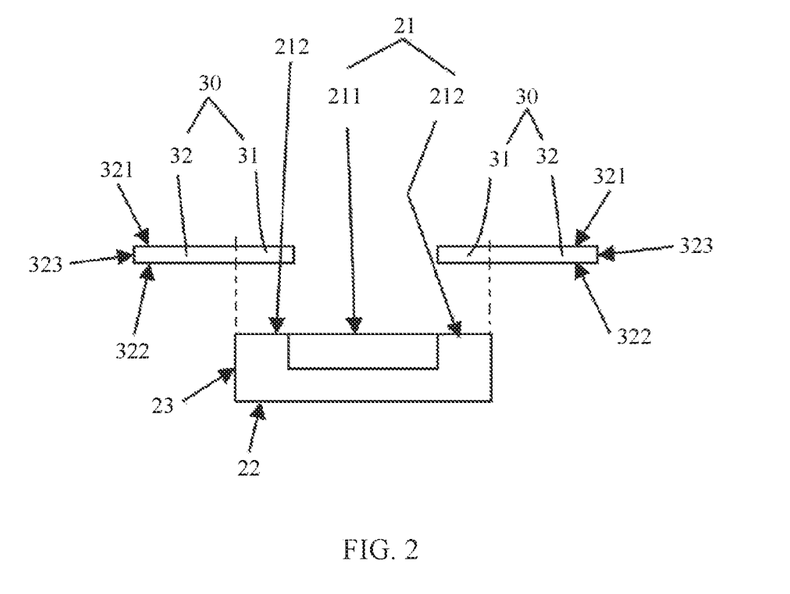
FIG. 2 is a schematic exploded diagram of a frame adhesive and a fingerprint module in a structural component according to an embodiment of this application.
Figure 3:
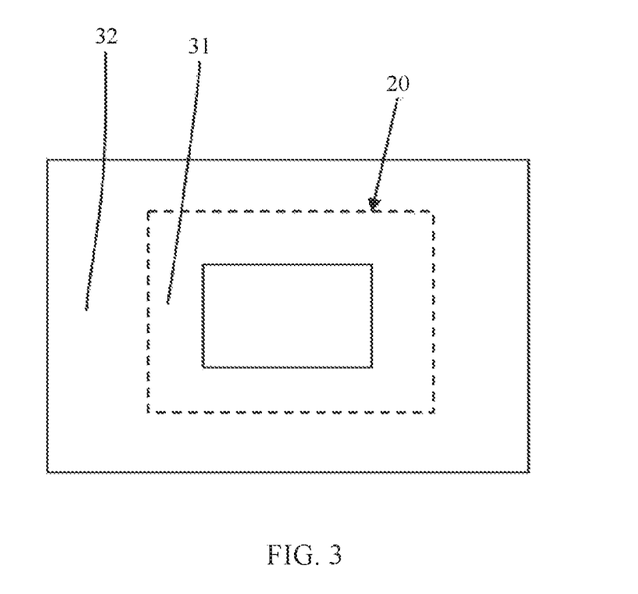
FIG. 3 is a schematic diagram of distribution of a frame adhesive and a fingerprint module on a plane on which the frame adhesive is located according to an embodiment of this application, where a dashed frame represents the fingerprint module.

Referring to FIG. 1, FIG. 2, and FIG. 3, the fingerprint module 20 includes a first surface 21 facing the screen 10, a second surface 22 away from the screen 10, and a side surface 23 connected between the first surface 21 and the second surface 22. The first surface 21 is a functional surface of the fingerprint module 20 and a recognition area of the fingerprint module 20 is disposed on the first surface 21.

The frame adhesive 30 includes a first connection area 31 and a second connection area 32 that are connected. The second connection area 32 is located on a periphery of the first connection area 31. The first connection area 31 is bonded to the first surface 21. The second connection area 32 extends from an edge of the first connection area 31 to an outer side of the fingerprint module 20, and the second connection area 32 is fastened to the side surface 23 by using a first sealing adhesive 40. In FIG. 2, two dashed lines from the fingerprint module 20 to the frame adhesive 30 represent a boundary between the first connection area 31 and the second connection area 32.

In this embodiment of this application, the fingerprint module 20 is disposed in the display area of the screen 10, and the fingerprint module 20 is fastened by using the frame adhesive 30 and the first sealing adhesive 40, so that the first surface 21 of the fingerprint module 20 is fastened to the screen 10 by using the frame adhesive 30, and the side surface of the fingerprint module 20 is fastened to the second connection area 32 of the frame adhesive 30 by using the first sealing adhesive 40. In this way, the fingerprint module 20 is firmly fastened, and a path between the fingerprint module 20 and the screen 10 is well sealed to prevent moisture from entering a fingerprint recognition area of the fingerprint module 20. Further, the frame adhesive 30 is accommodated in the through hole. When the frame adhesive is accommodated in the through hole, a gap is maintained between the frame adhesive and an inner wall 131 of the through hole. In other words, a size of the through hole is greater than a size of the frame adhesive 30. When the frame adhesive 30 is installed in the through hole, a gap still exists between an edge of the frame adhesive 30 and the inner wall 131 of the through hole. This gap facilitates installation and removal of the frame adhesive 30. In this implementation, the through hole is formed by removing a part of material of the light shielding layer 12, so that a thickness of the screen 10 at the light transmission region 13 becomes thinner, and the frame adhesive 30 is accommodated in the through hole. This helps reduce the overall thickness of the structural component and the electronic apparatus. The formation of an installation space facilitates installation and removal of the frame adhesive 30 and the fingerprint module 20. During the installation and removal, the installation space facilitates the use of a tool.

Figure 4:
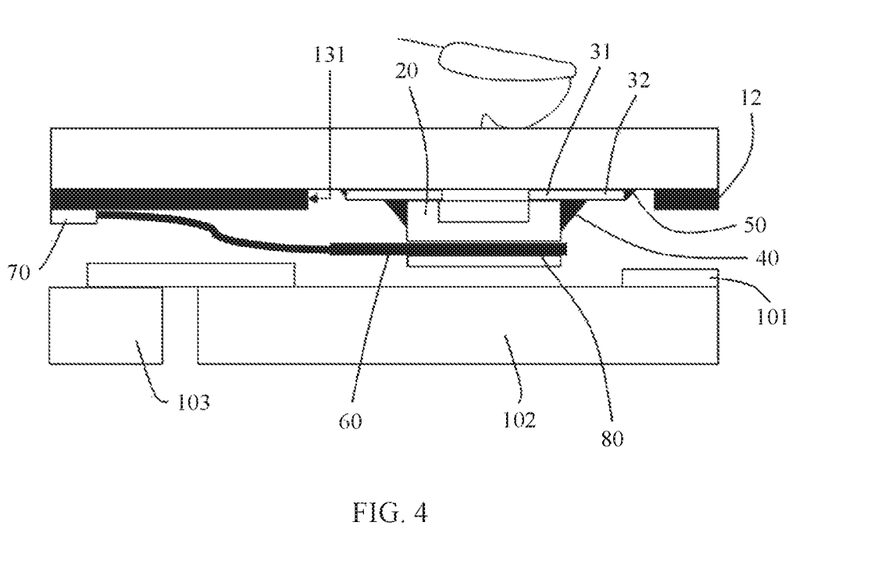
FIG. 4 is a schematic cross-sectional diagram of a structural component according to another embodiment of this application.

Referring to FIG. 4, the second connection area 32 includes an outer edge away from the first connection area 31, the outer edge is fastened to the screen 10 by using a second sealing adhesive 50, and a gap is disposed between the second sealing adhesive 50 and the inner wall 131 of the through hole. The second sealing adhesive 50 increases a bonding force between the frame adhesive 30 and the screen 10. The gap facilitates the installation and removal of the fingerprint module.

Figure 5:
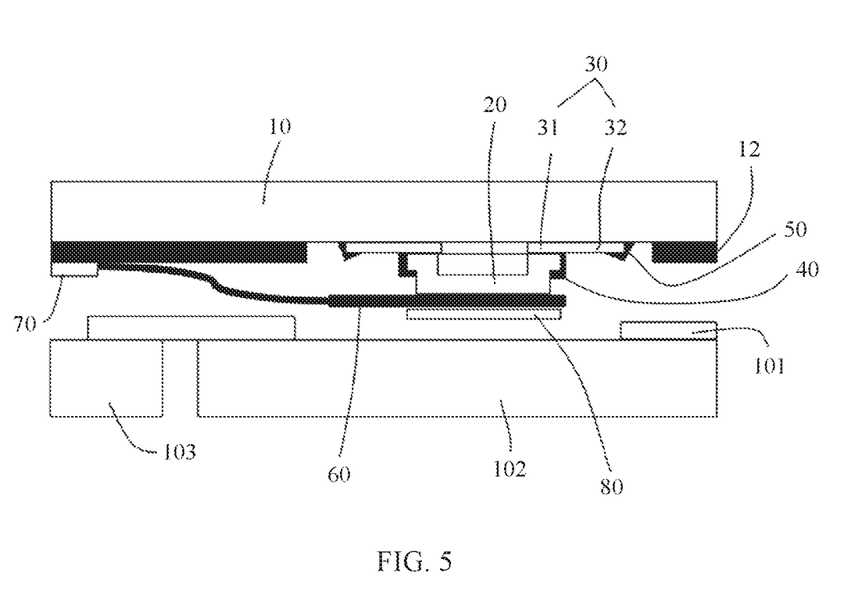
FIG. 5 is a schematic cross-sectional diagram of a structural component another according to an embodiment of this application.

Referring to FIG. 2 and FIG. 5, in an implementation, the outer edge of the second connection area 32 includes an attaching surface 321 bonded to the screen 10, an outer surface 322 away from the screen 10, and a side connection surface 323 connected between the attaching surface 321 and the outer surface 322. The second sealing adhesive 50 covers the side connection surface 323 and a part of the outer surface 322. In other words, the second sealing adhesive 50 wraps two surfaces connected at a corner of the outer edge of the second connection area 32, to improve bonding.

In an implementation, the side surface 23 of the fingerprint module 20 includes a step surface and/or a rough surface, and the first sealing adhesive 40 is bonded to the step surface and/or the rough surface and fastened to the frame adhesive 30, to improve bonding reliability. The step surface and the rough surface increase an area in which the first sealing adhesive 40 is bonded to the side surface of the fingerprint module 20, to improve bonding strength. A side surface of the fingerprint module 20 shown in FIG. 5 is a step surface, and the step surface extends a longer path, resulting in a larger area in which the first sealing adhesive 40 is bonded to the side surface. The side surface may be a rough surface that includes a concave-convex texture by using a surface processing direction. The concave-convex texture results in a larger area in which the first sealing adhesive 40 is bonded to the side surface, to increase the bonding force.

In this embodiment of this application, a size of the second connection area 32 of the frame adhesive 30 is greater than a size of the first connection area 31, and an area in which the frame adhesive 30 is bonded to the screen 10 is greater than twice an area in which the frame adhesive 30 is bonded to the fingerprint module 20, so that the bonding is more stable and the fingerprint module 20 is not easy to fall off.

In an implementation, the frame adhesive 30 is of an opaque structure. As shown in FIG. 1 and FIG. 2, the first surface 21 of the fingerprint module 20 includes a recognition area 211 and a frame area 212 surrounding the recognition area 211, the frame adhesive 30 is attached to the frame area 212, and an air layer is formed between the recognition area 211 and the screen 10. In this implementation, the light shielding layer 12 is replaced with the opaque frame adhesive 30, to ensure a light shielding effect of the display area the screen.

In an implementation, the fingerprint module 20 is partially embedded into the through hole, so that a size of the structural component and the electronic apparatus is thinner.

In an implementation, as shown in FIG. 3, the frame adhesive 30 is an integrated closed frame structure. In another implementation, the frame adhesive 30 may also be a non-closed structure. The frame adhesive 30 includes a plurality of segments of sub-adhesive, and the plurality of segments of sub-adhesive are arranged in a frame structure. Specifically, a shape of each segment of sub-adhesive may be a straight line segment shape, an L shape, a U shape, or the like.

A flexible circuit board 60 is disposed on the second surface 22 of the fingerprint module 20, a screen connector 70 is disposed on the screen 10, and the flexible circuit board 60 is electrically connected to the screen connector 70. A stiffener 80 is disposed on a side that is of the flexible circuit board 60 and that is away from the second surface 22.

Specifically, the electronic apparatus further includes a middle frame 101. The screen 10 is installed on one side of the middle frame 101, and a battery 102 and a mainboard 103 are disposed on the other side of the middle frame 101. In other words, the middle frame 101 is located between the screen 10 and the battery 102. The screen 10 is installed on a top surface of the middle frame 101, and the battery 102 and the mainboard 102 are disposed at the bottom of the middle frame 101. The stiffener 80 that is of the flexible circuit board 60 and that is away from the second surface may be integrated with the middle frame 101. Alternatively, the stiffener 80 is fastened to the flexible circuit board 60, and a through hole is disposed at a corresponding position on the middle frame 101 and the stiffener 80. This facilitates a light and thin design of the electronic device.

With reference to FIG. 1 to FIG. 5, this application further provides a method for assembling a fingerprint module 20, including:

providing a screen 10, where an outer surface of the screen 10 is a touch surface 11, an inner surface of the screen 10 is a light shielding layer 12, and a light transmission region 13 is formed on the light shielding layer 12 in a display area of the screen 10;

attaching a frame adhesive 30 to the light transmission region 13, where the frame adhesive 30 includes a first connection area 31 and a second connection area 32 that are connected, and the second connection area 32 is located on a periphery of the first connection area 31;

providing a fingerprint module 20, where the fingerprint module 20 includes a first surface 21 facing the screen 10, a second surface 22 away from the screen 10, and a side surface 23 connected between the first surface 21 and the second surface 22;

bonding the first surface 21 of the fingerprint module 20 to the first connection area 31; and disposing a first sealing adhesive 40 between the second connection area 32 and the side surface 23 of the fingerprint module 20.

In an implementation, the light transmission region 13 is formed by disposing a through hole on the light shielding layer 12, and an installation space is formed between the frame adhesive 30 and an inner wall 131 of the through hole.

In an implementation, the method further includes: disposing a second sealing adhesive 50 between an outer edge that is of the second connection area 32 and that is away from the first connection area 31 and the screen 10.

The foregoing descriptions are merely specific implementations of this application, but are not intended to limit a protection scope of this application. Any variation or replacement readily figured out by a person skilled in the art within the technical scope disclosed in the present invention shall fall within the protection scope of the present invention. Therefore, the protection scope of this application shall be subject to the protection scope of the claims.

What is claimed is:

1. An electronic apparatus comprising:
   a screen comprising:
      a display area;
      an outer surface, wherein the outer surface is a touch surface; and
      an inner surface, wherein the inner surface is a light shielding layer, and wherein the light shielding layer comprises a light transmission region located in the display area;
   a fingerprint circuit attached to the light transmission region and comprising:
      a first surface facing the screen;
      a second surface facing away from the screen; and
      a side surface coupled between the first surface and the second surface, wherein the side surface comprises a step surface and a rough surface; and
   a frame adhesive configured to attach the fingerprint circuit and the light transmission region, wherein the frame adhesive comprises:
      a first connection area configured to bond to the first surface; and
      a second connection area coupled to the first connection area and located on a periphery of the first connection area, wherein the second connection area is configured to:
         bond to the first surface; and
         fasten to the side surface using a first sealing adhesive,
         wherein the first sealing adhesive is configured to bond to the step surface and the rough surface.

2. The electronic apparatus of claim 1, wherein the light transmission region is a through hole disposed on the light shielding layer, and wherein the frame adhesive is accommodated in the through hole.

3. The electronic apparatus of claim 2, wherein the second connection area comprises an outer edge away from the first connection area, wherein the outer edge is fastened to the light transmission region using a second sealing adhesive, and wherein a gap is disposed between the second sealing adhesive and an inner wall of the through hole.

4. The electronic apparatus of claim 3, wherein the outer edge comprises an attaching surface configured to bond to the light transmission region, a second outer surface away from the screen, and a side connection surface coupled between the attaching surface and the second outer surface, and wherein the second sealing adhesive is configured to cover the side connection surface and a part of the second outer surface.

5. The electronic apparatus of claim 4, wherein a first size of the first connection area is greater than a second size of the second connection area.

6. The electronic apparatus of claim 5, wherein the frame adhesive is of an opaque structure, wherein the first surface comprises a recognition area and a frame area surrounding the recognition area, wherein the frame adhesive is attached to the frame area, and wherein an air layer is formed between the recognition area and the screen.

7. The electronic apparatus of claim 2, wherein the fingerprint circuit is partially embedded into the through hole.

8. The electronic apparatus of claim 1, wherein the light transmission region comprises a plurality of light transmission holes, and wherein the light transmission holes are disposed on the light shielding layer and distributed in an array.

9. The electronic apparatus of claim 1, wherein the frame adhesive is an integrated closed frame structure.

10. The electronic apparatus of claim 1, wherein the frame adhesive comprises a plurality of segments of sub-adhesive, and wherein the segments of sub-adhesive are arranged in a frame structure.

11. The electronic apparatus of claim 1, further comprising:
    a screen connector disposed on the screen; and
    a flexible circuit board disposed on the second surface and electrically coupled to the screen connector.

12. The electronic apparatus of claim 11, further comprising a stiffener disposed on a side of the flexible circuit board away from the second surface.

13. An electronic apparatus comprising:
    a screen comprising:
       a display area;
       an outer surface, wherein the outer surface is a touch surface; and
       an inner surface, wherein the inner surface is a light shielding layer, and wherein the light shielding layer comprises a light transmission region located in the display area;
    a fingerprint circuit attached to the light transmission region and comprising:
       a first surface facing the screen;
       a second surface facing away from the screen; and
       a side surface coupled between the first surface and the second surface, wherein the side surface comprises a step surface; and
    a frame adhesive configured to attach the fingerprint circuit and the light transmission region, wherein the frame adhesive comprises:
       a first connection area configured to bond to the first surface; and
       a second connection area coupled to the first connection area and located on a periphery of the first connection area, wherein the second connection area is configured to:
          bond to the first surface; and
          fasten to the side surface using a first sealing adhesive,
          wherein the first sealing adhesive is configured to bond to the step surface.

14. The electronic apparatus of claim 13, wherein the frame adhesive is an integrated closed frame structure.

15. The electronic apparatus of claim 13, wherein the frame adhesive comprises a plurality of segments of sub-adhesive, and wherein the segments of sub-adhesive are arranged in a frame structure.

16. The electronic apparatus of claim 13, further comprising:
    a screen connector disposed on the screen;
    a flexible circuit board disposed on the second surface and electrically coupled to the screen connector; and
    a stiffener disposed on a side of the flexible circuit board away from the second surface.

17. An electronic apparatus comprising:
    a screen comprising:
        a display area;
        an outer surface, wherein the outer surface is a touch surface; and
        an inner surface, wherein the inner surface is a light shielding layer, and wherein the light shielding layer comprises a light transmission region located in the display area;
    a fingerprint circuit attached to the light transmission region and comprising:
        a first surface facing the screen;
        a second surface facing away from the screen; and
        a side surface coupled between the first surface and the second surface, wherein the side surface comprises a rough surface; and
    a frame adhesive configured to attach the fingerprint circuit and the light transmission region, wherein the frame adhesive comprises:
        a first connection area configured to bond to the first surface; and
        a second connection area coupled to the first connection area and located on a periphery of the first connection area, wherein the second connection area is configured to:
            bond to the first surface; and
            fasten to the side surface using a first sealing adhesive,
            wherein the first sealing adhesive is configured to bond to the rough surface.

18. The electronic apparatus of claim 17, wherein the frame adhesive is an integrated closed frame structure.

19. The electronic apparatus of claim 17, wherein the frame adhesive comprises a plurality of segments of sub-adhesive, and wherein the segments of sub-adhesive are arranged in a frame structure.

20. The electronic apparatus of claim 17, further comprising:
    a screen connector disposed on the screen;
    a flexible circuit board disposed on the second surface and electrically coupled to the screen connector; and
    a stiffener disposed on a side of the flexible circuit board away from the second surface.

* * * * *